United States Patent [19]
Maiocchi

[11] Patent Number: 5,764,020
[45] Date of Patent: Jun. 9, 1998

[54] METHOD AND APPARATUS FOR SYNCHRONOUS DRIVING OF THE PHASE WINDINGS OF A DC MOTOR

[75] Inventor: Giuseppe Maiocchi, Villa Guardia, Italy

[73] Assignee: SGS-Thomson Microelectronics, S.r.l., Agrate Brianza, Italy

[21] Appl. No.: 828,671

[22] Filed: Mar. 31, 1997

[30] Foreign Application Priority Data

Apr. 4, 1996 [EP] European Pat. Off. ............ 96830190

[51] Int. Cl.$^6$ .................................................. H02P 6/18
[52] U.S. Cl. .................... 318/705; 318/439; 318/721
[58] Field of Search .................................. 318/138, 254, 318/439, 705, 720, 721, 724

[56] References Cited

U.S. PATENT DOCUMENTS

| | | |
|---|---|---|
| 4,431,953 | 2/1984 | Schray et al. ............... 318/254 |
| 4,874,993 | 10/1989 | Tanaka et al. ............... 318/254 |
| 5,130,620 | 7/1992 | Inaji et al. ................... 318/254 |

FOREIGN PATENT DOCUMENTS

| | | |
|---|---|---|
| 0 316 077 A1 | 5/1989 | European Pat. Off. . |
| 0 324 396 A2 | 7/1989 | European Pat. Off. . |

*Primary Examiner*—Bentsu Ro
*Attorney, Agent, or Firm*—Allen, Dyer, Doppelt, Milbrath & Gilchrist, P.A.

[57] ABSTRACT

Synchronization of the phase switchings in driving a brushless motor with predefined excitation current profiles of substantially nonconstant value, is improved by continuously correcting the rotor position information detected by zero-cross detecting circuits with an updatable delay value. A switching delay counter is started by the raw zero-cross pulse to determine the generation of a corrected synchronization pulse. The delay counter is downloaded with a constantly updated value by monitoring the correction signal produced by a speed control loop and by incrementing or decrementing the downloaded value in the counter to minimize the correction signal.

8 Claims, 9 Drawing Sheets

BRUSHLESS CONFIGURATION WINDINGS
AND CONSTANT PROFILE CURRENTS

TRANSCONDUCTANCE AND CONTROL
FOR CONSTANT PROFILE
CURRENT LOOP

Figure 2:
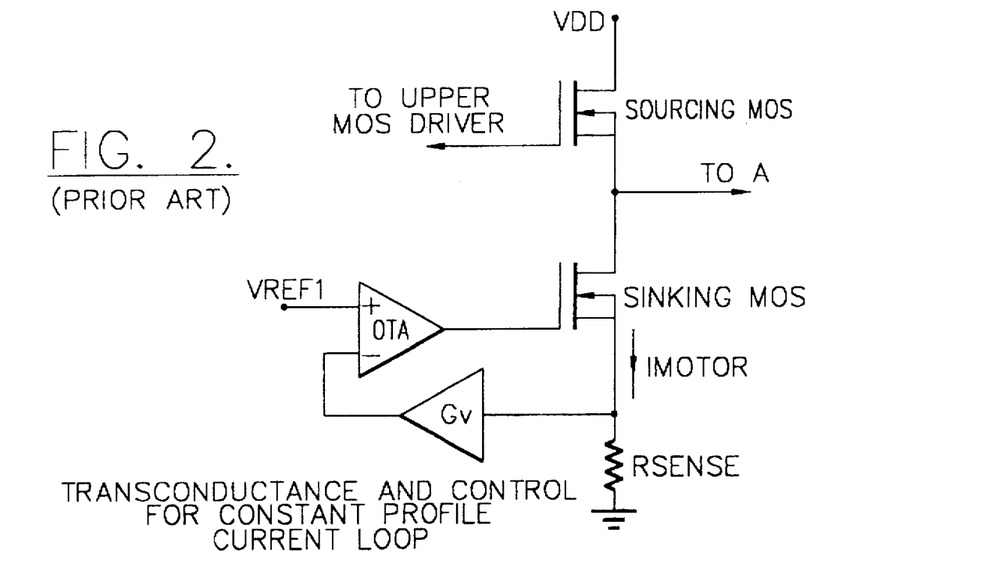
FIG. 2 is a functional diagram of a transconductance control loop of the output current, according to a known technique as in the prior art, as already described.
Figure 3:
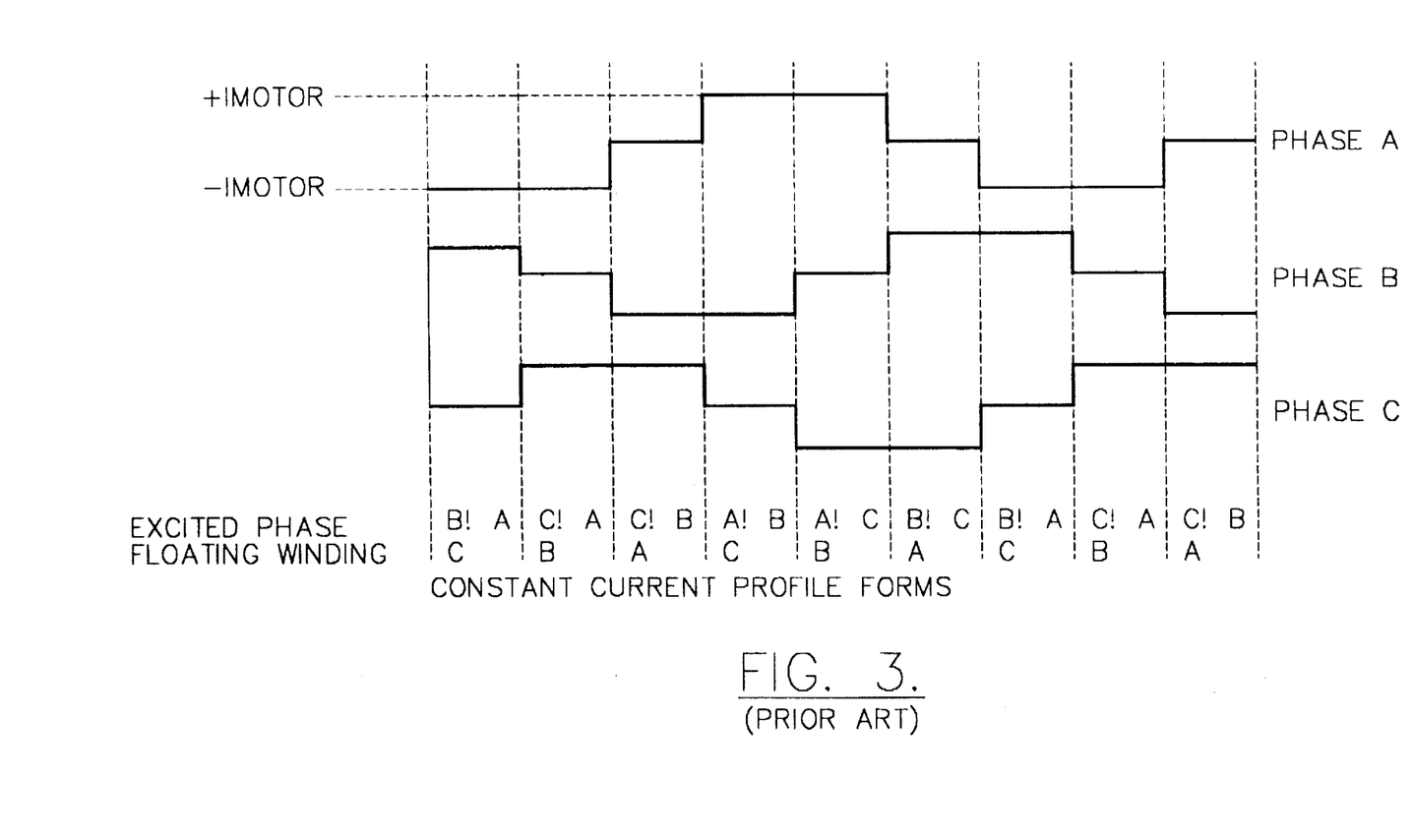
FIG. 3 shows waveforms of the current through three phase windings, according to a known technique as in the prior art.

SENSING OF BEMF SIGNAL
OF PHASE C

ically driven using an integrated circuit whose output stage is represented by a polyphase full-wave bridge circuit, which, in the case of a three-phase motor, may employ six bipolar (BJT) or field effect transistors (MOS) power transistors as shown in FIG. 2. Commonly, current the motor is linearly controlled through a transconductance loop, as shown in FIG. 3, in the case of current mode control. Of course it is also possible to drive the motor in a voltage mode.

METHOD AND APPARATUS FOR SYNCHRONOUS DRIVING OF THE PHASE WINDINGS OF A DC MOTOR

FIELD OF THE INVENTION

The present invention relates to techniques for driving an electronically switched sensorless motor. More in particular this invention relates to a monitoring and reconstructing technique of induced signals that represent the angular position of the rotor.

BACKGROUND OF THE INVENTION

Electronically switched DC motors are used in innumerable control and regulation applications, adjustment, and also as mass memory drive systems in the case of rotating media such as hard disks, floppy disks, optical disks, CD-ROMs, as well as for of linear media, such as tape streamers and the like. Commonly, these motors are polyphase motors in a "star" configuration. Quite common is the case of a motor having three phase windings connected in a star configuration and defining six different switching phases and P number of poles. In this case, there will be a number 3*P of equilibrium points in a complete revolution of the rotor.

Figure 1:
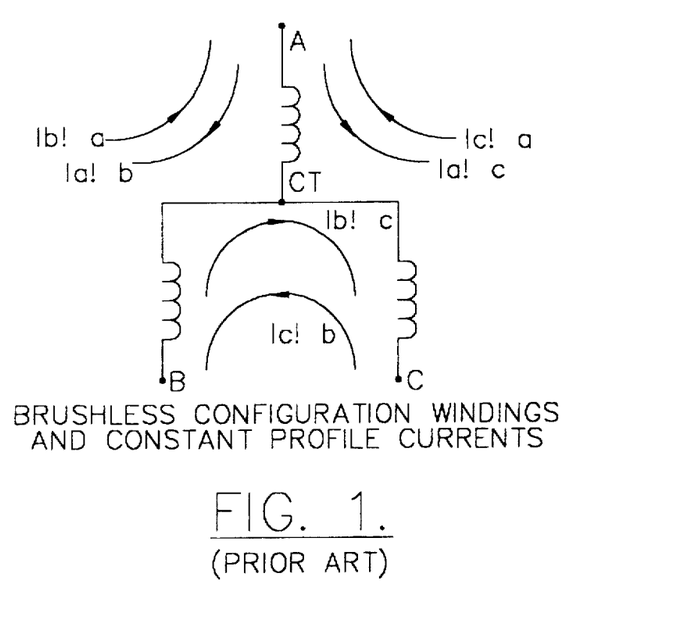
FIG. 1 shows in a schematic manner the meaning of the phase notations used in this context as in the prior art.

In the present text, each excitation phase will be indicated according to a standard rotation by two capital letters. The first capital letter (for example, A, B or C) defines the winding through which the current conventionally flows from the respective supply terminal towards the star center (CT). The second capital letter, preceded by the sign (!), designates the winding through which the current, conventionally coming from the star center (CT), flows toward the supply terminal of the relative winding. A scheme of excitation for the six phases A!B, A!C, B!C, B!A, C!A, C!B, referred to the case of a three winding motor is shown in FIG. 1.

These brushless motors are commonly driven using an integrated circuit whose output stage is represented by a polyphase full-wave bridge circuit, which, in the case of a three-phase motor, may employ six bipolar (BJT) or field effect transistors (MOS) power transistors as shown in FIG. 2. Commonly, current the motor is linearly controlled through a transconductance loop, as shown in FIG. 3, in the case of current mode control. Of course it is also possible to drive the motor in a voltage mode.

During a certain switching phase of the motor, the "sourcing" power transistor is forced into full conduction (that is, to saturation for the case of a MOS device), whereas the "sinking" power transistor operates as an element of transconductance, according to the scheme of FIG. 3, which refers to the use of MOS type power devices. With reference to FIG. 3, the motor current may be expressed as follows:

$$Imotor = \frac{Vref}{Gv} * Rs$$

where Vref is the control voltage that may be supplied by a motor's speed control phase-locked loop (PLL) that regulates the speed of the motor. Gv is the voltage gain of the sensing amplifier, while Rs is the current sensing resistor.

In the prior art, the voltage Vref is regulated at a certain level by the control loop in order to regulate the current absorbed by the motor in maintaining a certain speed. Of course, the control loop acts on the Vref value by varying its instantaneous value about a certain mean value to compensate for instantaneous load-torque variations. For this reason, during each excitation phase, the motor current is regulated to at certain level, substantially to a constant level (±Imotor) as shown in the diagram of FIG. 3.

As it can be noticed in FIG. 3, at any instant, one of the three phase windings of the motor is not excited. The switching to a next phase in the sequence, for instance from phase A!B to phase B!C, must be synchronized with the rotor position to obtain the maximum possible torque at the motor shaft.

Figure 4:
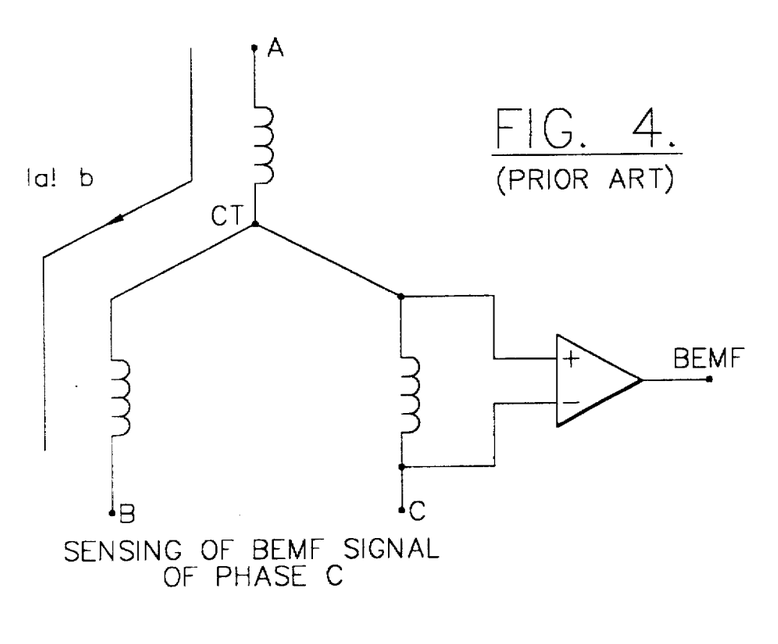
FIG. 4 shows the monitoring circuit of the BEMF signal on the phase winding of the motor, which is not excited in that phase as in the prior art.

According to the prior art, this synchronization can be assured by employing appropriate sensors of the rotor position, such as for example, Hall effect sensors. As an alternative, which has become a common practice, the same result is obtained by detecting and processing back electromotive force (BEMF) signals, developing on the motor phase windings, due to the rotor rotation. The processing essentially includes detecting the crossing of a predetermined level (zero crossing) by the BEMF signal which typically has a periodical waveform, relevant to the phase winding, that is momentarily not excited by a driving current, according to a detection diagram as shown in FIG. 4, for the A!B excitation phase.

Figure 5:
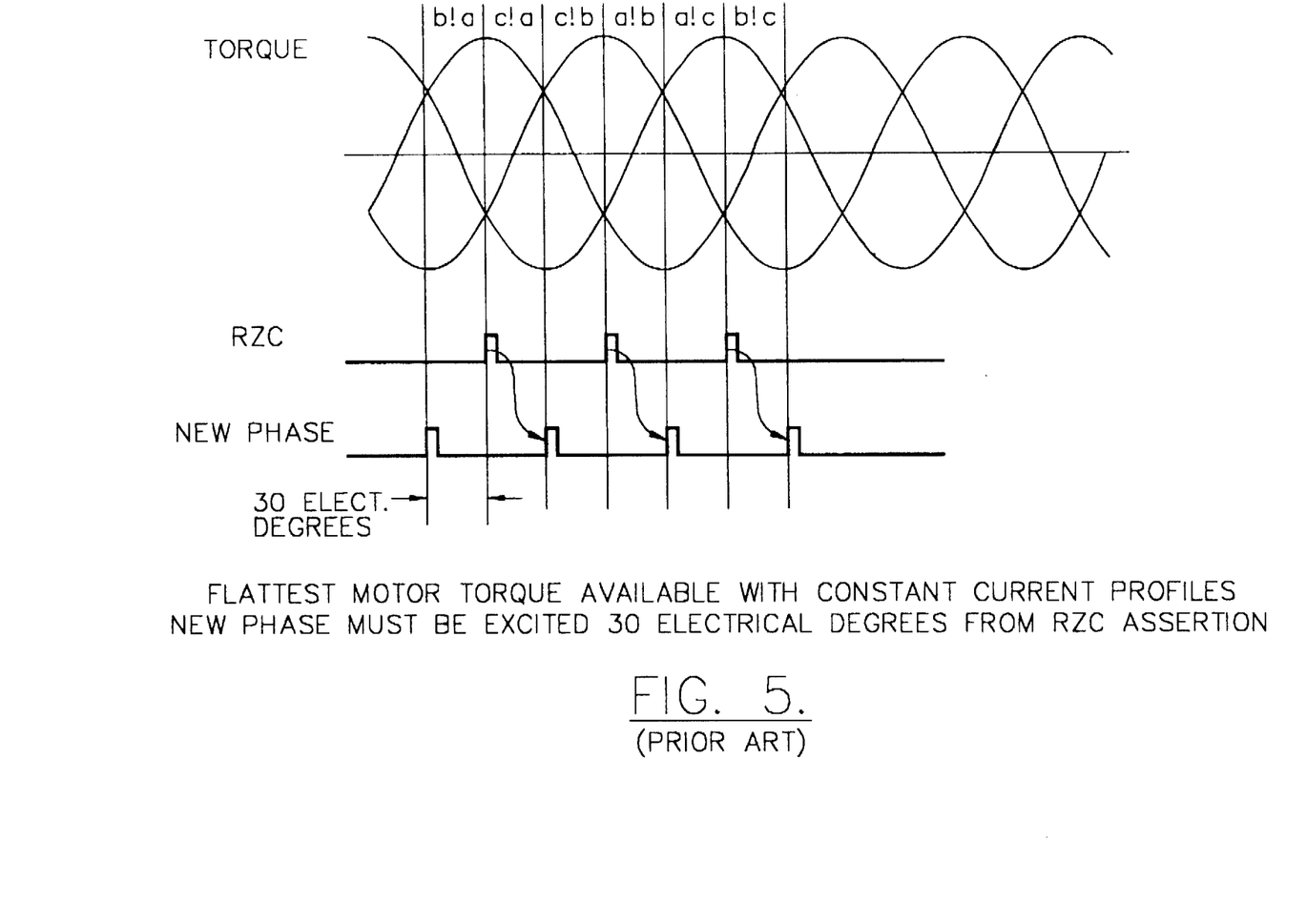
FIG. 5 shows the relation existing between the characteristics of torque produced by motor with phase commutation synchronism as in the prior art.

These systems, described in number of documents, generate a pulse at each zero crossing that is used by the driving system to actuate a new phase switching. The case of a three phase winding, star-connected motor, defining six distinct switching phases for a complete revolution of the rotor, is shown in FIG. 5.

The monitoring circuitry of the respective BEMF signals in the three windings of the motor and the relative circuitry recognition and processing of the zero crossing events, produces the logic pulse RZC, which is set at each zero crossing and reset following its assertion by the synchronization logic circuitry. In the example considered, it may be noticed that to obtain the maximum available torque, the next phase must be excited theoretically after 30 electrical degrees from the zero cross instance (set of RZC).

If the zero cross signal is strictly correlated to the motor rotor position and this relation is time invariant, the delay between the instance of a zero cross and the optimum instant at which the new phase of motor driving should be switched, is time invariant as well. Therefore, once defined, every phase is excited with this identical delay from the zero cross instant.

On the other hand, according to an advanced driving technique, it is foreseen to force excitation currents in the motor windings, not of a substantially constant level, but with a certain profile, that can be predefined, digitalized and stored in digital form in a non-volatile static memory, such as for instance an EPROM or EEPROM memory. The predefined profile can be grossly sinusoidal, or generally resulting from a Fourier summation of harmonics of a fundamental frequency. Therefore, according to this new technique which enables optimizing of the motor torque characteristics, the current forced in the motor windings is not constant during each excitation phase, but it has a cyclic or alternating waveform. This technique is described and shown in the European patent application No. 96830180.4, filed on Mar. 29, 1996 of the present assignee, whose entire content is here included for herein by reference.

According to this technique, the complete current profile, having of course a cyclic or alternating waveform, is stored in a number of sequences, as many as the number of switching phases, each sequence consisting of a number N of samples. Each sequence which according to that technique, substitutes the constant level of phase driving, is converted into an analog signal by a digital/analog converter which drives the output power stage, for instance a transconductance feedback stage of the type, as the one shown in FIG. 2. In practice, the converted profile provides the driving Vref signal to the respective power stage.

Naturally, even according to this technique it is necessary to assure a perfect synchronization of phase switching with the rotor position, so that following each assertion of the RZC signal, a new sequence of N digital samples is read and converted, the value of each sample being stored as a digital datum (word) composed of a number n of bits. Since at each switching phase the level of the currents or of the current forced in the relevant motor phase windings is not constant but varies in intensity following the profile defined by the respective sequence of samples, this causes instants at which a certain phase winding of the motor will not be excited (crossed by a current). Therefore, there will not be an easy discrimination of the zero-cross event by part of the back electromotive force signal BEMF induced on such momentarily non-excited winding. This is due to the fact that, since the excitation current is no longer constant, the voltage detected at the ends of each motor phase winding is the sum of distinct contributions or terms, given by the following expression:

$$Vd = L*dI/dt \text{ è } R*I + BEMF$$

where L is the winding inductance, R the resistance and I the instantaneous value of the current.

Figure 6:
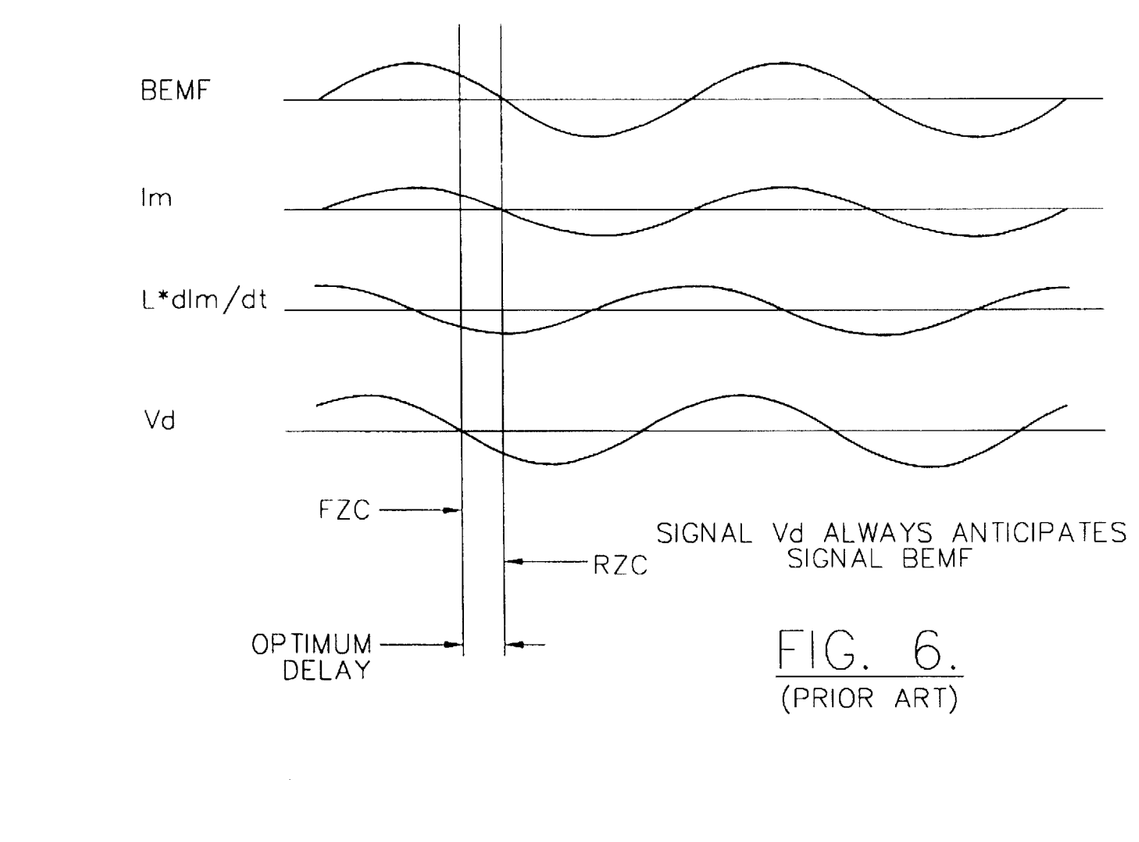
FIG. 6 shows how the signal Vd detected on a phase winding of the motor anticipates the BEMF signal when driving the different phases with essentially non-constant currents as in the prior art.

Assuming that the profile of the current this is forced in the motor windings is sinusoidal or consisting of a Fourier series of harmonics of a base frequency, it is easy to check that the maximum torque is produced when the current (or the fundamental harmonic of the series) is perfectly in phase with the BEMF induced on the same winding. However, as already said, the signal Vd that is detected across a winding, due to the term L*dI/dt will be anticipated with respect to the BEMF term. This peculiarity of operation may be recognized in the diagrams of FIG. 6. Therefore, the zero-cross event, detected on the Vd signal as detected at the ends of each phase winding of the motor, occurs in advance if compared to the actual BEMF signal. The detection of a zero crossing event in the Vd signal produces in practice a "false" zero-cross pulse FZC, that anticipates the instant of correct synchronization, identified in the diagrams as RZC (Real Zero Crosses). To ensure a perfect synchronization, it is necessary to assert the signal RZC, reflecting the actual rotor position, but the pure BEMF component of the monitored signal Vd cannot be directly read or discriminated, and this represents a problem.

SUMMARY OF THE INVENTION

Therefore, a main objective of the present invention is that of providing a method and a system for reconstructing correct synchronization information, that is, to generate a synchronization pulse RZC, starting from false synchronization information in the form of a FZC pulse, to use the reconstructed RZC signal to synchronize the motor phase switching.

Basically, the method of the invention detecting zero-cross events of the monitored voltage Vd on each phase winding, producing a logic pulse FZC of pseudo or false zero-cross at each zero-cross event; starting upon the assertion of the pulse FZC a switching delay timer that may be pre-loaded with a certain default value; monitoring the eventual increase or decrease of the driving current or voltage through the respective winding, produced by the rotation speed regulation loop of the motor (Vref in FIG. 2); increasing or decreasing accordingly the default delay value; updating the content of the timer to the minimum value that maintains the speed constant and checked, meaning by that, the minimum regulation voltage in case of a linear control or minimum digital value or duty-cycle value in case of a digital driving signal; and generating a true or real zero-cross RZC pulse after a delay equivalent to the last updated value contained in the timer after each assertion of the FZC signal and employing this RZC signal to command the switching phase of the excitation.

BRIEF DESCRIPTION OF THE DRAWINGS

The different aspects and advantages of the invention will became clearer through the following description of some important embodiments and by making reference to the attached drawings, wherein.

DETAILED DESCRIPTION OF PREFERRED EMBODIMENTS

The system of the invention permits generating a pulse representing a real zero-cross event by the BEMF signal induced in a phase winding of the motor starting from a zero-cross signal obtained by monitoring the Vd voltage monitored at the ends of the phase winding. The invention is effective when the power devices of the output stages that drive the phase windings of the motor work in a linear fashion (push-pull), as well as when these power devices work in the so-called PWM mode (Pulse Width Modulation). In this latter case, it is necessary to adopt one of the known techniques to eliminate (filter) the PWM commutation noise. One of these techniques switches to a linear working mode, a defined time before a new zero-cross event is detected and switches back to a PWM operation mode after the zero-cross event has been detected. The European Patent No. EP-0 429 412-B1 describes an alternative technique of digital filtering of the commutation noise.

Figure 7:
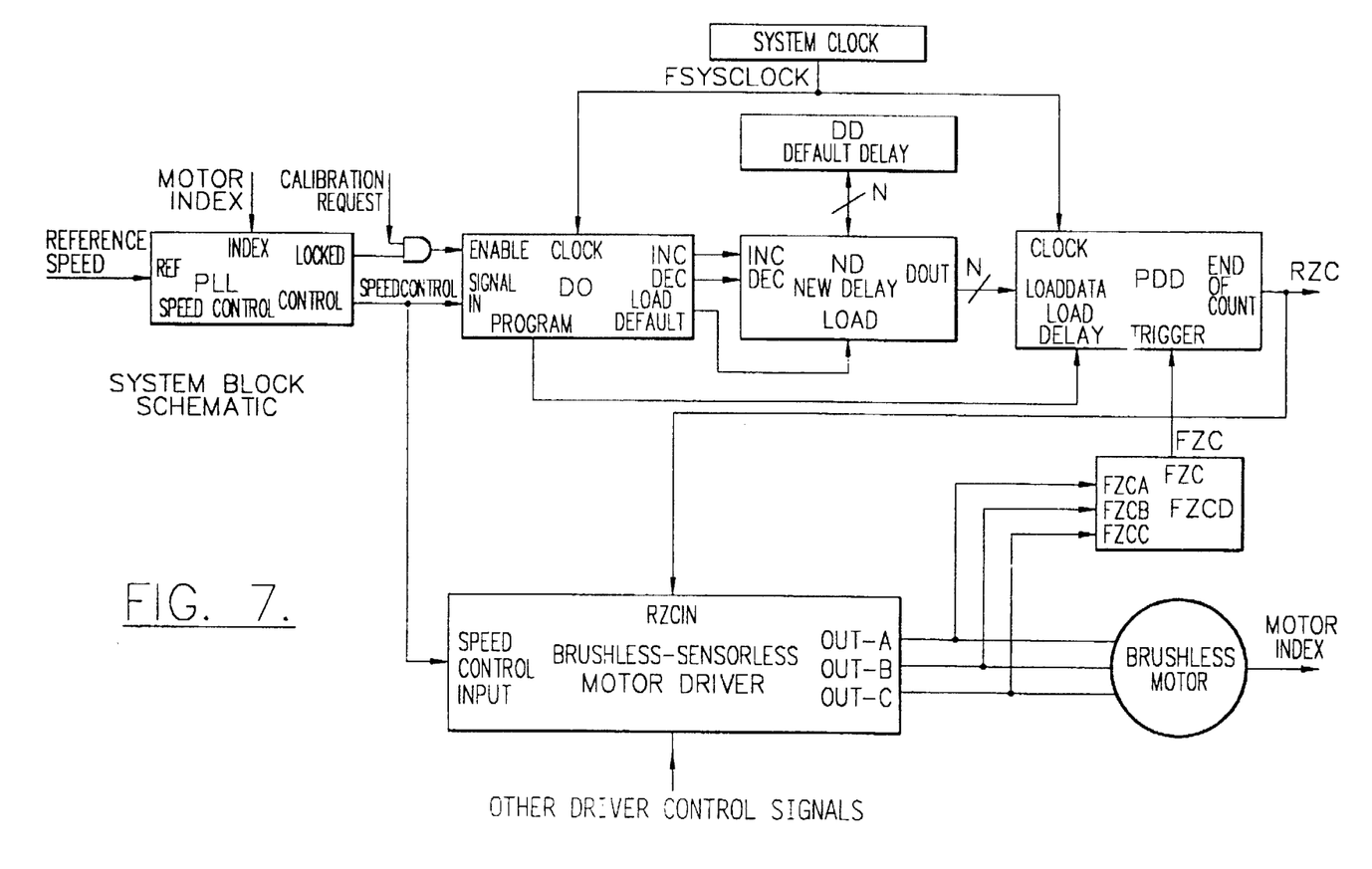
FIG. 7 is a functional block diagram of the system of the invention for generating a correct synchronization signal.

A fundamental requirement for the operation of the system in accordance with the invention is that the speed control loop be enabled. We will see later how the system works when the speed control loop is not in a locked condition, like during start-up of the motor. The block diagram of a system implemented according to the invention is shown in FIG. 7. The block MOTOR DRIVER indicates as a whole the driving circuits suitable to supply through the outputs OUT-A, OUT-B, and OUT-C, driving currents to the respective phase windings of the motor, according to a predefined profile, that is, currents which generally do not have a constant value during each phase of commutation.

The block FZCD (False Zero Cross Detector) represents any suitable circuit of monitoring, processing and detecting of zero-cross events of the voltage present at the ends of the respective phase winding of the motor. In practice, this block FZCD satisfactorily may be any known circuit, such as for instance a circuit as the one described in the European Patent no. EP-0 544 628-B1, or any other known circuit, equivalent thereto from a functional viewpoint.

When a zero-cross instance occurs on whichever phase winding, as the windings are being cyclically selected by the same circuit, the logic signal FZC (False Zero Cross) is set. The setting of FZC signal is used to trigger the one shot counter PDD (Programmable Digital Delay) that starts counting clocked by the system's clock FSYSCLOCK. At the end of the count, the PDD counter generates (sets) the logic signal RZC which represents a so corrected zero-cross signal used to synchronize phase switching, that is to start the scanning of a new sequence of digital samples of the pre-loaded driving profile.

The PDD block is down loaded through the parallel n-bit port LOADDATA, by the block ND (New Delay) containing the optimum delay value to be loaded in the PDD block (in practice the optimized delay between FZC and RZC signals such to enable a perfectly synchronized phase switching and therefore obtain the maximum torque at the motor's shaft). The ND block may include an "up/down" counter, whose content corresponds to the optimum delay value as updated by the system. At power up, this counter ND is loaded with a digital value contained in the n-bit DD register, which represents a default delay value stored in the DD register during system calibration. This default delay value is used as the phase switching delay during the start up routine of the motor and more generally during the periods when the motor speed control loop is not locked (that is not enabled). The DO (Delay Optimizer) block represents the core of the invented system.

The description of its operation will be more easily understood by making some preliminary considerations. To maintain a programmed rotation speed Ωm, the motor needs to generate a given torque Tm. The generated torque Tm is a function of the excitation current Im according to the following equation:

$$Tm=Km*Im$$

where Km is the motor constant.

Figure 8A:
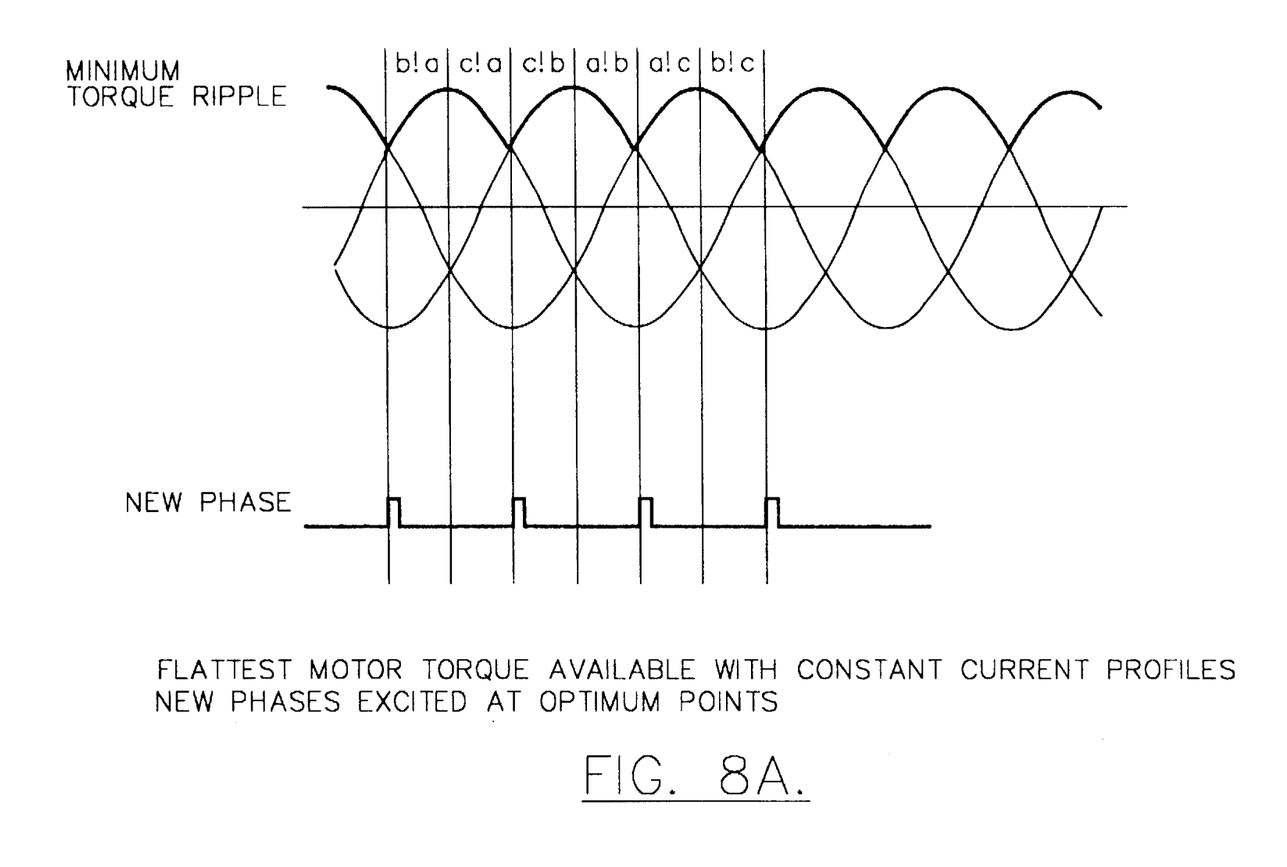
FIGS. 8A and 8B show the characteristic of torque produced by the motor in a case of a phase switching perfectly synchronized with the rotor position or when the switching takes place out of synchronism.
Figure 8B:
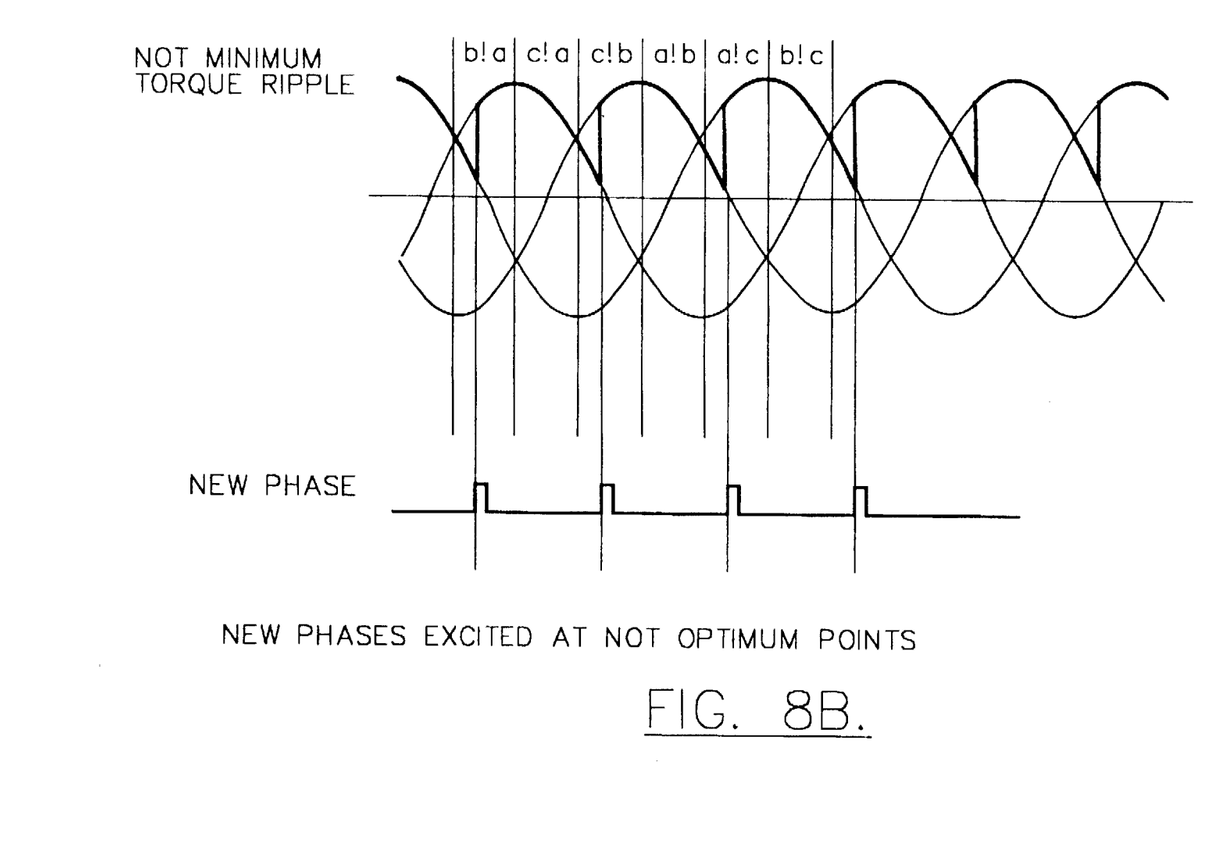

If motor current profiles are synchronized at best, the flattest torque curve of the rotor position will be obtained, thus overall current absorption will be reduced. FIG. 8A shows this condition of operation in the already considered case of driving the distinct excitation phases with substantially constant currents, but a similar behavior may be observed also when excitation currents during each phase are not constant (or almost constant in view of the control exerted by the transconductance loop when operating in a current control mode), but follow a certain predefined profile (for instance, a sinusoidal profile). In both cases, this worsening of the torque characteristics happens when phase switching is not well synchronized with the rotor position as shown in FIG. 8B. As it can be noticed in this case the torque characteristic presents an accentuated ripple, resulting in decrease of the average torque available at the motor's shaft and therefore in a proportional increase of current absorption as commanded by the speed control loop. In fact, to compensate for this reduction of the torque at motor shaft, the current Im must increase to maintain the preestablished rotation speed.

In these examples, the speed control loop PLL is enabled. The SPEEDCONTROL signal, generated by the speed control loop PLL increases its level if it is an analog signal, or its duty-cycle if it is a digital signal, or its digital value if the signal is digitized on n bits. According to the system of the invention this control signal SPEEDCONTROL produces an increase or a decrease of the content of the ND counter such as to reduce the SPEEDCONTROL signal to a minimum value for attaining the selected rotation speed. This function is performed by the block DO, by decrementing or incrementing (updating) the content of the ND counter, which in turn loads the DD register.

Of course, at least at the beginning, a delay calibration has to be made to program the DD register whose content is used as default delay when the motor is operated in an open loop mode of speed control. Calibration routines may be programmably performed at each system power-up or even at set intervals during operation to compensate possible variations of the governing parameter. The calibration strategy can be decided by the user.

Figure 9:
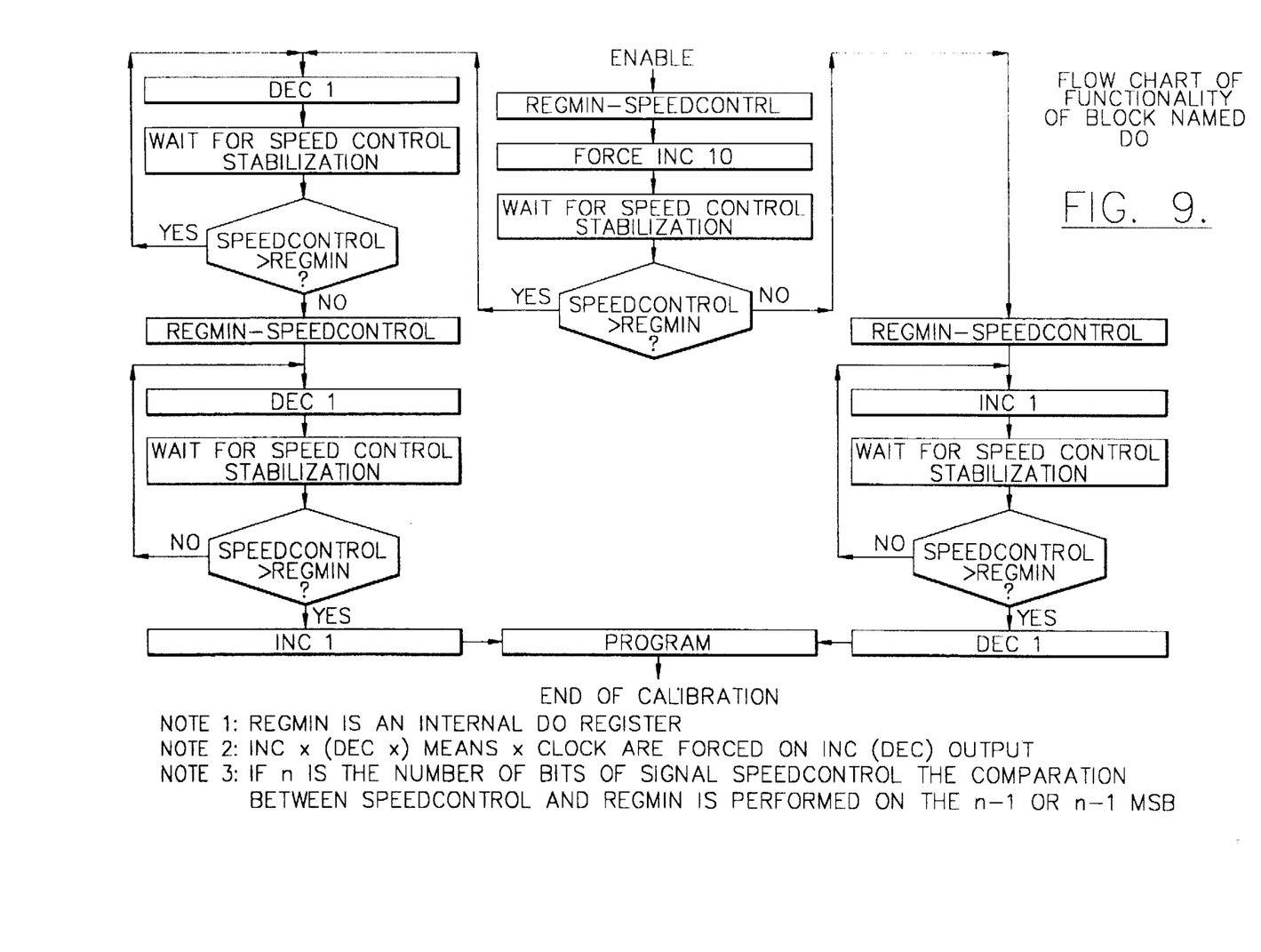
FIG. 9 is the flow-chart of operation of the block DO.

FIG. 9 shows the flow chart of the operation of the DO block. Of course, the block DO may be structured in any suitable way in a circuit to provide for the functions described in the flow chart of FIG. 9. Should the SPEEDCONTROL signal be of the analog type, it will be digitized by an appropriate ADC in a n-bit datum. In the comparison between the (digital) signal SPEEDCONTROL with the REGMIN value contained in an appropriate internal register of the block DO, the latter may consider only n-1 or n-2 MSB; to avoid false comparison results which could occur due to small corrections to the SPEEDCONTROL signal by the speed control loop.

I claim:

1. A method of synchronously driving the phase windings of a brushless motor according to predefined digitized driving profile having an essentially non-constant level during each excitation phase, the method including the steps of:

detecting zero-cross events of a voltage monitored on each phase winding, and producing a pulse at each detected zero-cross event;

starting by said pulse a switching delay counter, down loaded at power-up with a default delay value;

monitoring a correction signal for the excitation level of the relative phase winding of the motor generated by a speed control loop and incrementing or decrementing accordingly said default delay value to minimize the value of said correction signal for maintaining the motor speed under control; and switching the excitation phases after the lapse of said delay value contained in said switching delay counter.

2. A method according to claim 1 wherein the step of detecting zero-cross events comprises monitoring back electromotive force signals induced on the phase windings of the motor.

3. A method according to claim 1 wherein the step of monitoring the correction signal for the excitation level comprises monitoring an excitation current level of the relative phase winding of the motor.

4. A method according to claim 1 wherein the step of monitoring the correction signal for the excitation level comprises monitoring an excitation voltage level of the relative phase winding of the motor.

5. An apparatus for synchronously driving the phase windings of a brushless motor according to predefined digitized driving profile having an essentially non-constant level during each excitation phase, said apparatus comprising:

means for detecting zero-cross events of a voltage monitored on each phase winding, and for producing a pulse at each detected zero-cross event;

a switching delay counter, down loaded at power-up with a default delay value;

mean for starting by said pulse the switching delay counter;

a speed control loop generating a correction signal for the excitation level of the relative phase winding of the motor;

means for monitoring the correction signal for the excitation level of the relative phase winding of the motor and for incrementing or decrementing accordingly said default delay value in said switching delay counter to minimize the value of the correction signal for maintaining the motor speed under control; and means for switching the excitation phases after the lapse of the delay value contained in said switching delay counter.

6. An apparatus according to claim 5 wherein said means for detecting zero-cross events comprises means for monitoring back electromotive force signals induced on the phase windings of the motor.

7. An apparatus according to claim 5 wherein said means for monitoring the correction signal for the excitation level comprises means for monitoring the correction signal for an excitation current level of the relative phase winding of the motor.

8. An apparatus according to claim 5 wherein said means for monitoring the correction signal for the excitation level comprises means for monitoring the correction signal for an excitation voltage level of the relative phase winding of the motor.

* * * * *